US011800476B2

United States Patent
Kamath

(10) Patent No.: US 11,800,476 B2
(45) Date of Patent: Oct. 24, 2023

(54) WIRELESS BMS HOST TIME SYNCHRONIZATION MECHANISM

(71) Applicant: Analog Devices International Unlimited Company, Limerick (IE)

(72) Inventor: Narsimh Dilip Kamath, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 170 days.

(21) Appl. No.: 17/222,681

(22) Filed: Apr. 5, 2021

(65) Prior Publication Data
US 2021/0377894 A1    Dec. 2, 2021

Related U.S. Application Data

(60) Provisional application No. 63/033,396, filed on Jun. 2, 2020.

(51) Int. Cl.
| | | |
|---|---|---|
| *H04L 7/04* | (2006.01) | |
| *H04L 7/00* | (2006.01) | |
| *H04J 3/06* | (2006.01) | |
| *H02J 7/00* | (2006.01) | |
| *H01M 10/42* | (2006.01) | |
| *B60L 50/64* | (2019.01) | |
| *H04W 4/38* | (2018.01) | |
| *H04W 56/00* | (2009.01) | |
| *G06F 13/42* | (2006.01) | |

(52) U.S. Cl.
CPC .... *H04W 56/0045* (2013.01); *G06F 13/4282* (2013.01); *H04W 4/38* (2018.02); *H04W 56/0015* (2013.01); *G06F 2213/3814* (2013.01)

(58) Field of Classification Search
CPC .............. H04W 56/0045; H04W 4/38; H04W 56/0015; G06F 13/4282; G06F 2213/3814
See application file for complete search history.

(56) References Cited

U.S. PATENT DOCUMENTS

| | | | | |
|---|---|---|---|---|
| 2018/0081390 | A1* | 3/2018 | Dominguez | .............. G06F 1/12 |
| 2018/0224887 | A1* | 8/2018 | Pitigoi-Aron | ..... H04L 12/40032 |

(Continued)

FOREIGN PATENT DOCUMENTS

| | | |
|---|---|---|
| EP | 2568632 | 3/2013 |
| WO | 2008044193 | 4/2008 |
| WO | WO-2021245164 A1 | 12/2021 |

OTHER PUBLICATIONS

"International Application Serial No. PCT/EP2021/064848, International Search Report dated Oct. 5, 2021", 5 pgs.

(Continued)

*Primary Examiner* — Andre Tacdiran
*Assistant Examiner* — Christopher Nguyen
(74) *Attorney, Agent, or Firm* — Schwegman Lundberg & Woessner, P.A.

(57) ABSTRACT

Low-cost time synchronization associated wireless Battery Management System (BMS) and a host controller are described herein. The time synchronization techniques described herein are low-cost because of the use of existing communicating lines without using adding additional dedicated lines or wires for synchronization. Moreover, the time synchronization techniques described herein may be implemented without complex circuitry.

15 Claims, 6 Drawing Sheets

(56) References Cited

U.S. PATENT DOCUMENTS

2019/0020433 A1* 1/2019 Pitigoi-Aron ....... H04W 56/001
2020/0077348 A1* 3/2020 Monajemi ............. H04L 1/0042

OTHER PUBLICATIONS

"International Application Serial No. PCT/EP2021/064848, Written Opinion dated Oct. 5, 2021", 6 pgs.

Ferrari, P, "An innovative distributed instrument for Wireless HART testing", IEEE Intrumentation and Measurement Technology Conference (I2MTC) Singapore, Singapore, IEEE, Piscataway, NJ, USA, (May 5, 2009), 1091-1096.

Mason, Tackett, "An implementation of time synchronization in low-power wireless sensor networks", System Theory (SSST), IEEE 43rd Southeastern Symposium On, IEEE, (Mar. 14, 2011), 61-66.

Shell, Cody, "Implementation of a wireless battery management system (WBMS)", IEEE International Instrumentation and Measurement Technology Conference (I2MTC) Proceedings, IEEE, (May 11, 2015), 1954-1959.

\* cited by examiner

WIRELESS BMS HOST TIME SYNCHRONIZATION MECHANISM

CLAIMS OF PRIORITY

This patent application claims the benefit of priority U.S. Provisional Patent Application Ser. No. 63/033,396, titled "WIRELESS BMS HOST TIME SYNCHRONIZATION MECHANISM," filed on Jun. 2, 2020, which is hereby incorporated by reference herein in its entirety.

TECHNICAL FIELD

The present disclosure generally relates to wireless Battery Management System (BMS), in particular time synchronization with a host system.

BACKGROUND

Electric cars have been gaining immense popularity. One factor facilitating adoption of electric vehicles has been improvement in battery management. Electric cars may monitor battery levels and communicate that information quickly and accurately to a control unit. With timely and precise battery level information, the electric car can operate more reliably and efficiently.

Some BMSs include a wired network (sometimes referred to as a "daisy chain"), where battery monitors are connected to a manager through a wired connection. However, wiring in an electric car comes at a cost and each wire can have its own reliability issue. Consequently, wireless BMSs have been recently introduced. However, using wireless communications in a BMS can come with its own issues. For example, a wireless BMS typically uses its own network clock for its operations while the control system of the car uses its own clock for its operations. Thus, if those two clocks are unsynchronized, data may be lost or become corrupted.

BRIEF DESCRIPTION OF THE DRAWINGS

Various ones of the appended drawings merely illustrate example embodiments of the present disclosure and should not be considered as limiting its scope.

DETAILED DESCRIPTION

The present inventor has recognized, among other things, a need for low-cost time synchronization associated wireless Battery Management System (BMS) and a host controller, as described herein. The time synchronization techniques described herein are low-cost because of the use of existing communicating lines without using adding additional dedicated lines or wires for synchronization. Moreover, the time synchronization techniques described herein may be implemented without complex circuitry.

This document describes a method to synchronize timing between a host controller and a wireless manager. The method may include detecting, at the host controller, a timing mismatch between the host controller and the wireless manager; in response to detecting the timing mismatch, transmitting a unique word to the wireless manager; obtaining a master timestamp from a clock at the host controller; and transmitting the master timestamp to the wireless manager.

This document also describes a method to synchronize timing of a wireless manager. The method may include detecting, at the wireless manager, reception of a unique word from a host controller; receiving a master timestamp from the host controller; and based on the master timestamp, adjusting timing of a clock at the wireless manager.

This document further describes a system including a host controller comprising a host clock, a wireless manager comprising a local clock, and a communication interface between the host controller and the wireless manager. The host controller may include a circuit configured to: in response to detecting a timing mismatch between the host and local clocks, transmitting a unique word to the wireless manager; obtaining a master timestamp from the host clock; and transmitting the master timestamp to the wireless manager; the wireless manager including a circuit configured to: receiving the unique word from the host controller; receiving the master timestamp from the host controller based on the master timestamp, adjusting timing of the local clock.

Figure 1A:
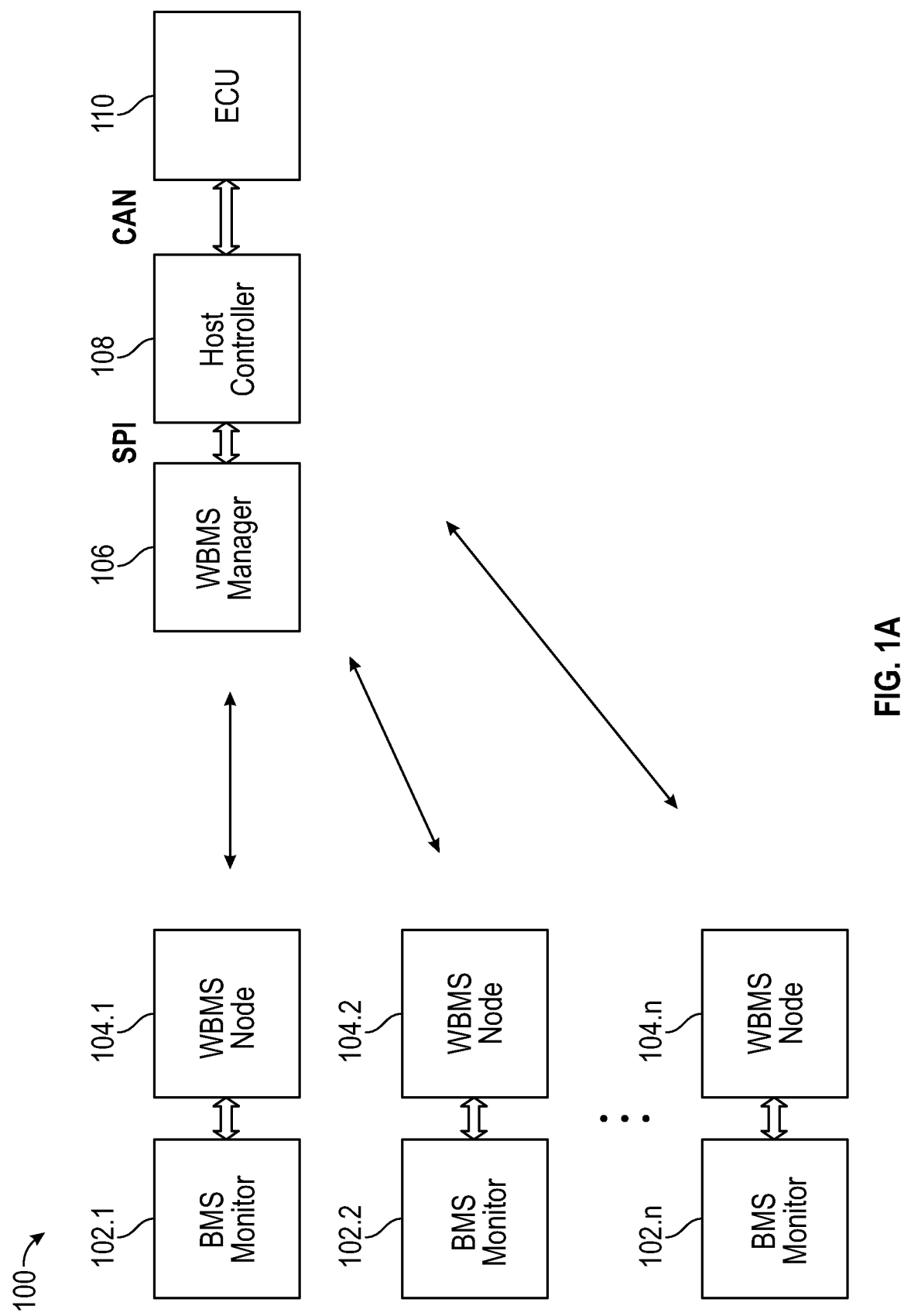
FIG. 1A illustrates a block diagram of a wireless BMS, according to an example of the present invention.

FIG. 1A illustrates a block diagram of a wireless BMS 100, according to an example of the present invention. The wireless BMS 100 may include a plurality of BMS monitors 102.1-102.$n$ coupled to respective WBMS nodes 104.1-104$n$. The wireless BMS 100 may also include a WBMS manager 106, a host controller 108, and an Electronic Control Unit (ECU) 110.

Each of the plurality of BMS monitors 102.1-102.$n$ may monitor a respective battery module. The BMS monitors 102.1-102.$n$ may be provided as integrated circuits. Such an integrated circuit can include a monolithically-integrated BMS circuit or an integrated module including multiple integrated circuit dice or other circuit elements within a commonly-shared integrated circuit device package, as illustrative examples. The BMS monitors 102.1-102.$n$ may sample respective battery voltages to monitor the battery level. The monitors 102.1-102.$n$ may also monitor current of the respective battery modules and the temperature.

Each of the BMS monitors 102.1-102.$n$ may be coupled to respective WBMS nodes 104.1-104.$n$ by a communication interface, for example by a Serial Peripheral Interface (SPI) or the like. Each pair of BMS monitors 102.1-102.$n$ and WBMS nodes 104.1-104.$n$ may be provided on a single printed circuit board (PCB). The WBMS nodes may include respective radio transceivers to communicate the battery measurements to a WBMS Manager over a wireless network.

As shown, a plurality of BMS monitors 102.1-102.$n$ may be provided. Each BMS monitor 102.1 may monitor a separate battery module. For example, the plurality of BMS monitors 102.1-102.$n$ may be provided in an electric vehicle, each monitoring a unique battery module in the electric car. Each BMS monitor 102.1-102.$n$ may be provided with its own WBMS node 104.1-104.$n$. And each WBMS node 104.1-104.$n$ may communicate with the WBMS Manager 106 over the wireless network. For example, the wireless network may be provided as a mesh network or the like.

Figure 1B:
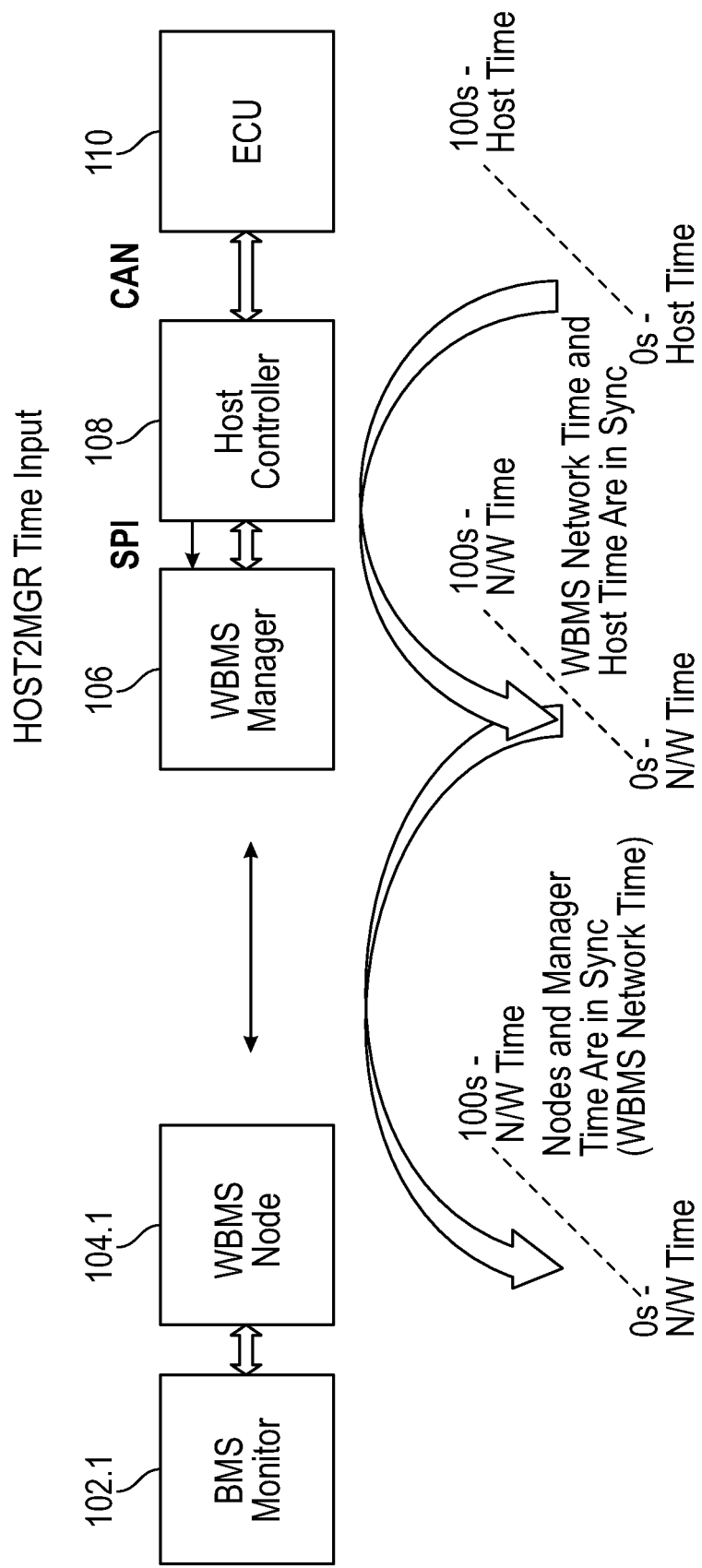
FIG. 1B illustrates timing synchronization of a wireless BMS, according to an example of the present invention.

FIG. 1B illustrates timing synchronization of wireless BMS 100, according to an example of the present invention. The WBMS Manager 106 and the plurality of WBMS nodes 104.1-104.$n$ may synchronize their docks based on a WBMS network time. For example, the WBMS Manager 106 may include a local clock, e.g., local crystal oscillator, which may operate as the master clock for the wireless network. The local clocks of the WBMS nodes 104.1-104.$n$ may be synchronized with the clock of the WBMS Manager 106 according to a network protocol.

The WBMS Manager 106 may be coupled to the Host Controller 106 by a communication interface, for example by a SPI. The Host Controller 106 may be provided as a microcontroller, microprocessor, or the like. The WBMS Manager 106 and the Host Controller 108 may be provided on a single PCB together. The Host Controller may be coupled to the ECU 110 via a wired connection, such as a Controller Area Network (CAN) bus.

Each BMS monitor 102.1-102.$n$ and coupled WBMS node 104.1-104.$n$ may measure the battery level of its respective battery module (e.g., voltage, current, temperature, etc.) and transmit the measurements periodically (e.g., every 100 milliseconds) to the WBMS Manager 106. The WBMS Manager 106 may receive battery measurements from the different WBMS nodes 104.1-104.$n$ and may communicate the measurements to the Host controller 108. The Host controller 108, in turn, may communicate information regarding the measured battery levels to the ECU 108. The Host Controller 108 may include a data buffer to collect battery measurement information and to send that information to the ECU 110.

Based on the battery measurement information, the ECU 110 may control operations of the electric car accordingly. For example, based on the battery measurement information, the ECU 110 may calculate a range of the battery, detect a problem with a battery module, and so forth.

The Host Controller 106 may include its own clock, e.g., referenced to a local oscillator such as a local crystal oscillator. The clocks of the Host Controller 106 and the ECU 108 may be synchronized. For example, the Host Controller 106 may synchronize its clock with the clock of the ECU 108. However, the WBMS Manager 106 clock and Host Controller 108 clock may be independent of each other. Therefore, if the clocks of the WBMS Manager 106 and the Host Controller 108 drift and are misaligned, data may be lost or corrupted.

To that end, the Host Controller 108 may utilize a timing message (e.g., "HOST2MGR TIME INPUT") to synchronize the clock of the WBMS Manager 106 with its clock. For time synchronization purposes, the Host Controller 108 may operate as a master and the WBMS Manager 106 may operate as a slave. The Host Controller 108 may generate and transmit the timing message upon detecting a timing mismatch between its clock and the clock of the WBMS Manager 106, e.g., a time desynchronization event. For example, the timing mismatch may be detected based on the status of a data buffer used by the Host Controller 108 to send battery measurement information to the ECU 110.

Also, over time, the WBMS Manager 106 clock may drift relative to the Host Controller 108 clock. If the error magnitude associated with such drift becomes greater than the buffer size or greater than some other threshold, the buffer may overflow and may release older data before it can be transmitted to the ECU 110, resulting in data loss or corruption. In another illustrative example, if the error of the drift reduces a frequency of the clock, the rate or edge boundaries of data in the buffer may be impacted, too, resulting in one or more of buffer underflow or possible data corruption. As such, either buffer overflow or buffer underflow may indicate a timing mismatch.

Figure 2:
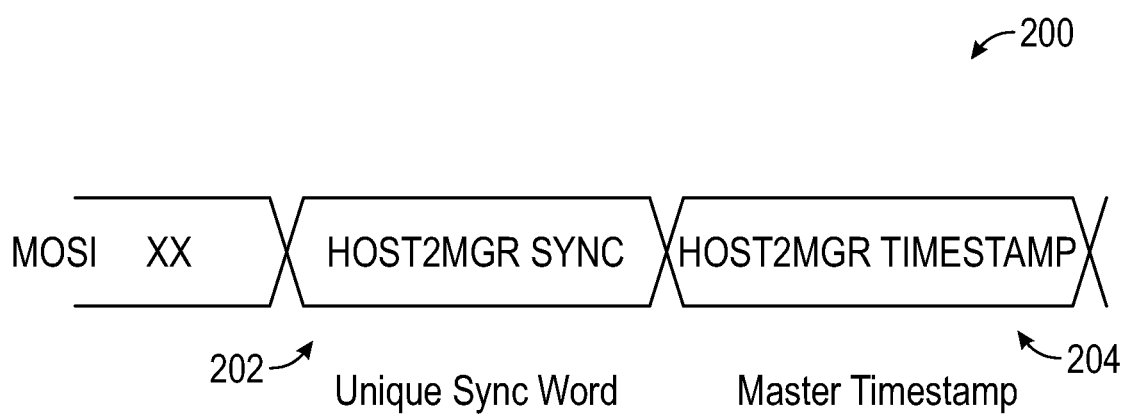
FIG. 2 illustrates a timing message, according to an example of the present invention.

FIG. 2 illustrates a timing message 200, according to an example of the present invention. As discussed herein, the timing message 200 may be sent by the Host Controller 108 to the WBMS Manager 106, as described above with reference to FIGS. 1A-1B, upon detection of a time desynchronization event.

Also, as discussed herein, the Host Controller 106 and the WBMS manager 108 may communicate using a communication interface, such as a SPI. In a SPI bus, there are four logic lines: SCLK—serial clock; MOSI—Master Output Slave Input; MISO—Master Input Slave Output; and CS—Chip/slave select.

The timing message 200 may be sent on the MOSI logic line of the SPI bus. The Host Controller 108 may operate as the master, and the WBMS Manager 106 may operate as the slave. Using the MOSI logic line to transmit the timing message provides the benefit of not using additional wires for time synchronization, as described herein.

The timing message 200 may include two parts: 1) a Unique Sync Word 202 and 2) a Master Timestamp 204. The Unique Sync Word 202 of the timing message 200 may immediately precede the Master Timestamp 204 of the timing message. As such, reception of the Unique Sync Word 202 may alert or notify the WBMS Manager 106 of the forthcoming Master Timestamp 204. The Unique Sync Word 202 may be a fixed set of bits. The Unique Sync Word 202 may be a fixed pattern. Hence, the WBMS Manager 106 may be programmed to detect the Unique Sync Word 202.

The Master Timestamp 204 may be a timestamp indicative of the timing of the clock signal of the Host Controller 108. The Master Timestamp 204 may be taken at the instant the last bit of the Unique Sync Word 202 is sent.

Figure 3:
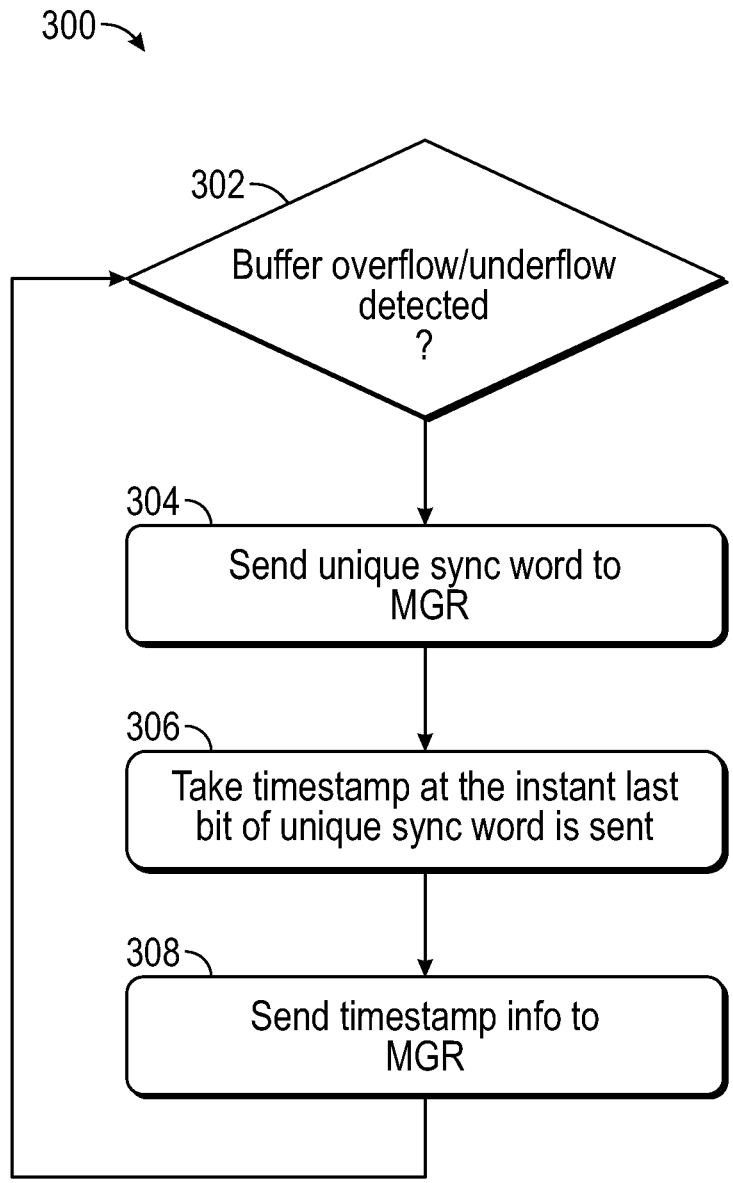
FIG. 3 illustrates a flow diagram for a method to transmit a timing message, according to an example of the present invention.

FIG. 3 illustrates a flow diagram for a method 300 to transmit a timing message, according to an example of the present invention. The method 300 may be executed by the Host Controller 108, as described above with reference to FIGS. 1A-1B. Also, the time message may be provided as timing message 200, as described above with reference to FIG. 2. Initially, the Host Controller 108 may detect an occurrence of a time desynchronization event. At 302, as described herein, the Host Controller 108 may detect whether the buffer is either in an overflow or an underflow state. If the Host Controller 108 detects either state, the Host Controller 108 may send the timing message 200 to synchronize the clock of the WBMS Manager 106 with its dock. At 304, the Host Controller 108 may transmit a Unique Sync Word 200 to the WBMS Manager 106 over a communication interface, e.g., MOSI line in a SPI bus. At 306, the Host Controller 108 may also obtain a timestamp of its clock at the instant the last bit of the Unique Sync Word 202 is sent, referred to as the Master Timestamp 204. At 308, the Host Controller 108 may transmit the Master Timestamp information to WBMS Manager over the communication interface (e.g., MOSI line in a SPI bus). Method 300 may then return to monitoring the state of the buffer (e.g., step 302).

Figure 4:
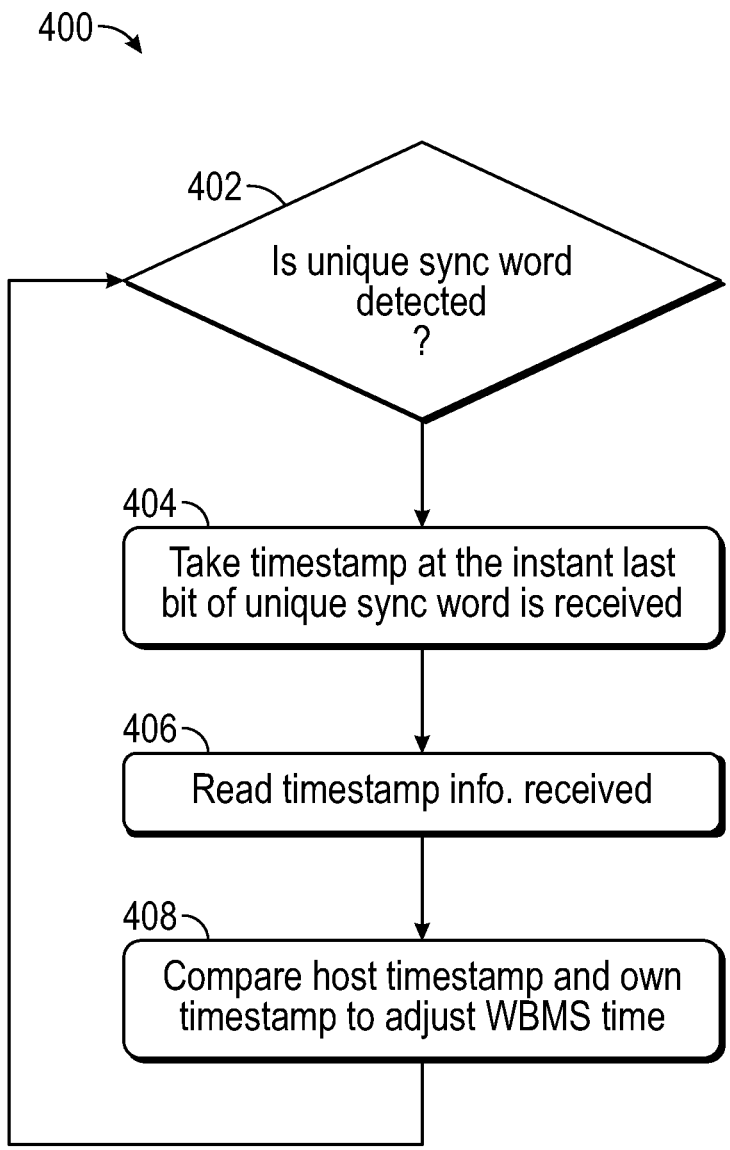
FIG. 4 illustrates a flow diagram for a method to synchronize timing of a WBMS Manager, according to an example of the present invention.

FIG. 4 illustrates a flow diagram 400 for a method to synchronize timing of a WBMS Manager, according to an example of the present invention. The method 400 may be executed by the WBMS Manager 106, as described above with reference to FIGS. 1A-1B. Also, the time message may be provided as timing message 200, as described above with reference to FIG. 2.

At 402, the WBMS Manager may detect the Unique Sync Word 202 in the received data stream coming from the Host Controller 108, for example on the MOSI line in the SPI bus. The WBMS Manager 106 may detect a fixed pattern or fixed set of bits, representing the Unique Sync Word 202.

If the Unique Sync Word 202 is detected, the WBMS Manager, at 404, may take a timestamp of its own clock at the instant the last bit of the Unique Sync Word 202 is received, referred to as Slave Timestamp. At 406, the WBMS Manager 106S may then read the Master Timestamp information 204 received following the Unique Sync Word 202 over the communication interface from the Host Controller. At 408, the WBMS Manager 108 may compare its Slave Timestamp to the received Master Timestamp. Both timestamps were taken relative to the last bit of the Unique Sync Word being transmitted/received. Based on the comparison of the two timestamps, if a drift is detected, the WBMS Manager 106 may adjust its timing (e.g., WBMS network time) to synchronize its time with the time of the Host Controller 108. The WBMS Manager 106 may then synchronize the timing of the WBMS nodes (e.g., WBMS nodes 104.1-104.n described above with reference to FIGS. 1A-1B), referred to as network time, such that WBMS nodes may also be synchronized with the timing of the Host Controller.

The synchronization techniques discussed above were described using a SPI between the WBMS Manager and the Host Controller for illustration purposes; other interfaces may also be employed. For example, the WBMS Manager and the Host Controller may be provided on separate PCBs, and they may be coupled using an Isolated SPI.

Figure 5:
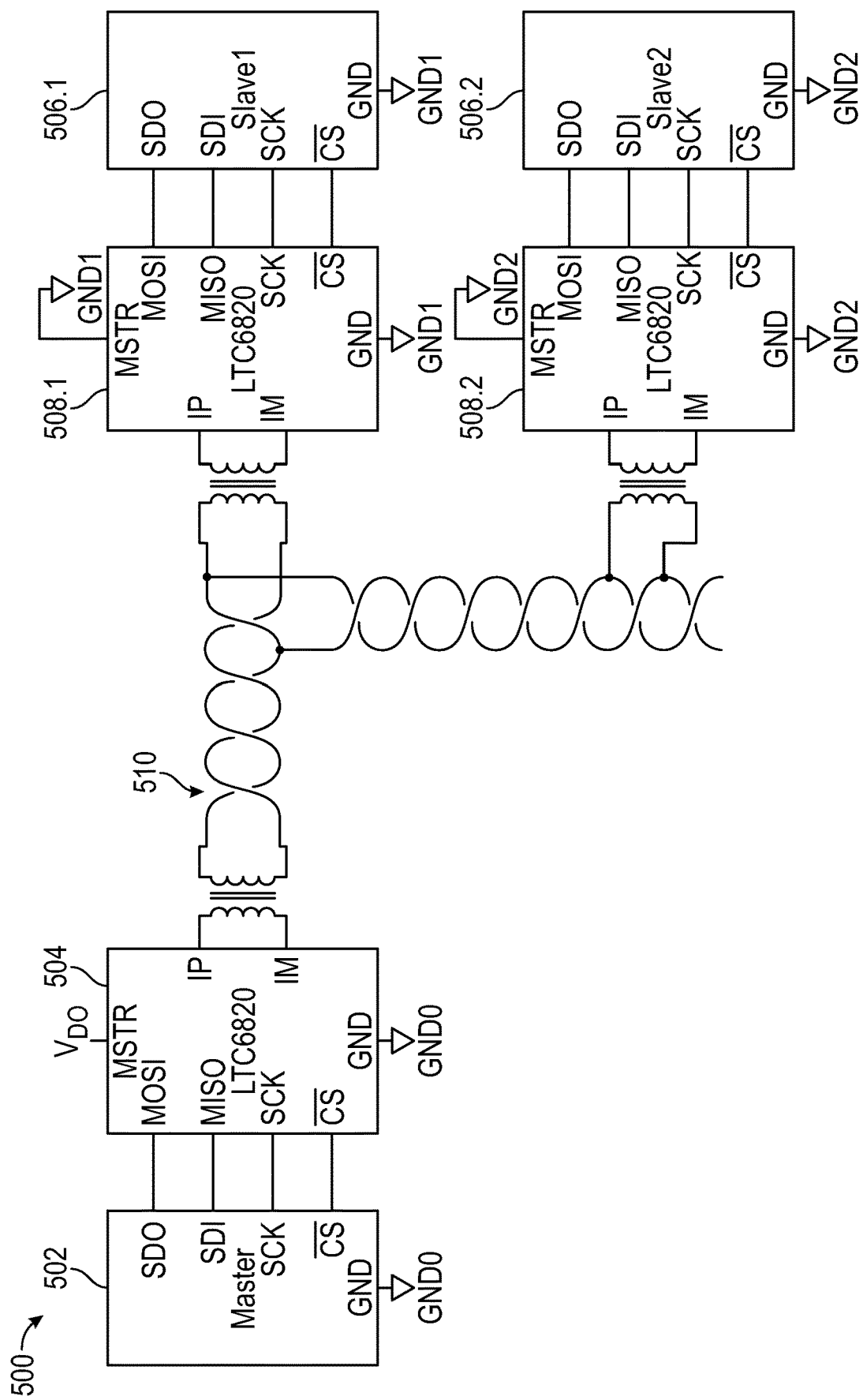
FIG. 5 illustrates an example of an isolated SPI system, according to an example of the present invention.

FIG. 5 illustrates an example of an Isolated SPI system 500, according to an example of the present invention. The system 500 may include a master node 502 with a master translator chip 504 and a plurality of slave nodes 506-1, 506.2 with respective translator chips 508.1, 508.2. Each node (master or slave) may include a translator chip, and the translator chip may include a SPI interface with its four logic lines (MOSI, MISO, SCLK, CS) and converts the signals from the SPI interface to an ISO SPI interface with a differential pair of wires 510 (IP, IM). In another example, a Universal Asynchronous Receiver-Transmitter (UART) interface may also be used with the synchronization techniques described herein.

Moreover, in an example, the WBMS Manager may be integrated with the Host Controller. In this example, the synchronization techniques described herein may be used between the timing of the integrated WBMS Manager/Host Controller and the ECU, where the timing of the integrated WBMS Manager/Host Controller may be synchronized with timing of the ECU.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method to synchronize timing between a host controller and a wireless manager, the method comprising:
    detecting, at the host controller, a timing mismatch between the host controller and the wireless manager; and
    in response to detecting the timing mismatch:
        transmitting a unique word including a fixed pattern of bits to the wireless manager using a common data line in a communication interface;
        obtaining a master timestamp from a clock at the host controller at an instant a specified bit of the fixed pattern of bits of the unique word is transmitted; and
        transmitting the master timestamp to the wireless manager using the common data line in the communication interface.

2. The method of claim 1, wherein the specified bit is a last bit of the unique word.

3. The method of claim 1, wherein the communication interface includes a serial peripheral interface (SPI), and wherein the unique word is transmitted over a Master Output Slave Input (MOSI) line of the SPI.

4. The method of claim 3, wherein the communication interface includes an isolated SPI.

5. The method of claim 1, further comprising:
    detecting a buffer overflow state, the buffer overflow state indicating the timing mismatch.

6. The method of claim 1, further comprising:
    detecting a buffer underflow state, the buffer underflow state indicating the timing mismatch.

7. A system, comprising:
    a host controller comprising a host clock;
    a wireless manager comprising a local clock;
    a communication interface between the host controller and the wireless manager, wherein the host controller including a circuit configured to in response to detecting a timing mismatch between the host and local clocks:
        transmitting a unique word including a fixed pattern of bits to the wireless manager using a common data line in the communication interface;
        obtaining a master timestamp from the host clock at an instant a specified bit of the fixed pattern of bits of the unique word is transmitted; and
        transmitting the master timestamp to the wireless manager using the common data line in the communication interface;
    the wireless manager including a circuit configured to:
        receiving the unique word from the host controller;
        obtaining a slave timestamp from the local clock at the wireless manager at an instant the specified bit of the unique word is received;
        receiving the master timestamp from the host controller;
        based on the master timestamp and slave timestamp, adjusting timing of the local clock.

8. The system of claim 7, wherein the specified bit is a last bit of the unique word.

9. The system of claim 7, wherein the communication interface includes a serial peripheral interface (SPI), and wherein the unique word is transmitted over a Master Output Slave Input (MOSI) line of the SPI.

10. A non-transitory machine-readable medium embodying instructions that, when executed by a machine, cause the machine to perform operations comprising:
    detecting, at a host controller, a timing mismatch between the host controller and a wireless manager; and
    in response to detecting the timing mismatch:
        transmitting a unique word including a fixed pattern of bits to the wireless manager using a common data line in a communication interface;
        obtaining a master timestamp from a clock at the host controller at an instant a specified bit of the fixed pattern of bits of the unique word is transmitted; and
        transmitting the master timestamp to the wireless manager using the common data line in the communication interface.

11. The non-transitory machine-readable medium of claim 10, wherein the specified bit is a last bit of the unique word.

12. The non-transitory machine-readable medium of claim 10, wherein the communication interface includes a serial peripheral interface (SPI), and wherein the unique word is transmitted over a Master Output Slave Input (MOSI) line of the SPI.

13. The non-transitory machine-readable medium of claim 12, wherein the communication interface includes an isolated SPI.

14. The non-transitory machine-readable medium of claim 10, wherein the operations further comprise:
    detecting a buffer overflow state, the buffer overflow state indicating the timing mismatch.

15. The non-transitory machine-readable medium of claim 10, wherein the operations further comprise:
    detecting a buffer underflow state, the buffer underflow state indicating the timing mismatch.

* * * * *